INVENTOR.
DANIEL BERECK.
ATTORNEY.

Jan. 14, 1930.  D. BERECK  1,743,092
DEVICE FOR DISPENSING EDIBLE COMMODITIES
Filed June 29, 1927  3 Sheets-Sheet 2

INVENTOR.
DANIEL BERECK.
ATTORNEY.

Jan. 14, 1930.    D. BERECK    1,743,092
DEVICE FOR DISPENSING EDIBLE COMMODITIES
Filed June 29, 1927    3 Sheets-Sheet 3
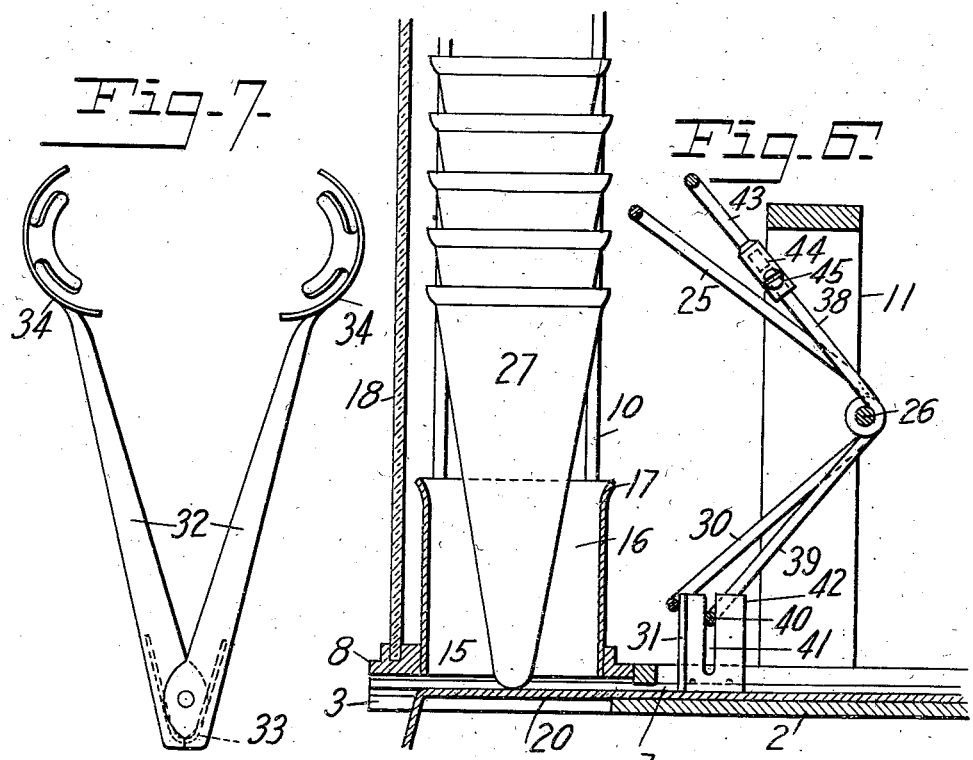
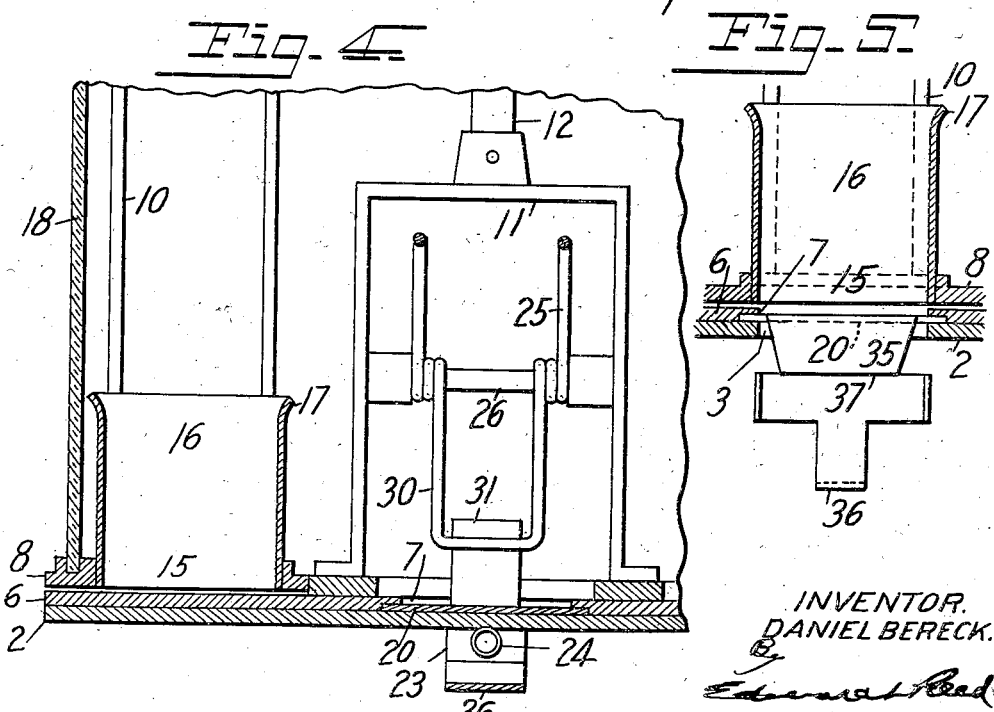
INVENTOR.
DANIEL BERECK.
ATTORNEY.

Patented Jan. 14, 1930

1,743,092

UNITED STATES PATENT OFFICE

DANIEL BERECK, OF DAYTON, OHIO, ASSIGNOR TO JAMES BALTON, OF DAYTON, OHIO

DEVICE FOR DISPENSING EDIBLE COMMODITIES

Application filed June 29, 1927. Serial No. 202,383.

This invention relates to a device for dispensing edible commodities and is designed more particularly for dispensing ice cream cones. Practically all the ice cream cones on the market today are manufactured and packed by machinery so that they are delivered to the retail dealer without having been touched by human hands. The usual methods of serving the cones result in their being very much handled by the person dispensing the same. The cones when shipped are usually nested in tubular containers or packages and in removing them it is customary to insert the fingers in the open end of the cone and lift the same from the package. The cone thus removed is then grasped by the hand and so held while being filled with ice cream and then handed to the customer.

One object of the invention is to provide an apparatus whereby the cones may be dispensed without having been touched by any hand prior to their being delivered to the customer.

A further object of the invention is to provide such an apparatus which will discharge the cones one at a time into a handling device by which the cone is supported while being filled and delivered to the customer.

A further object of the invention is to provide a handling device to receive and support the cone which will be of such a character as to firmly support the cone without danger of crushing or breaking the same.

A further object of the invention is to provide a dispensing apparatus which will be simple in its construction and operation, compact in form and which may be produced at a low cost.

Other objects of the invention will appear as the apparatus is described in detail.

Figure 1:
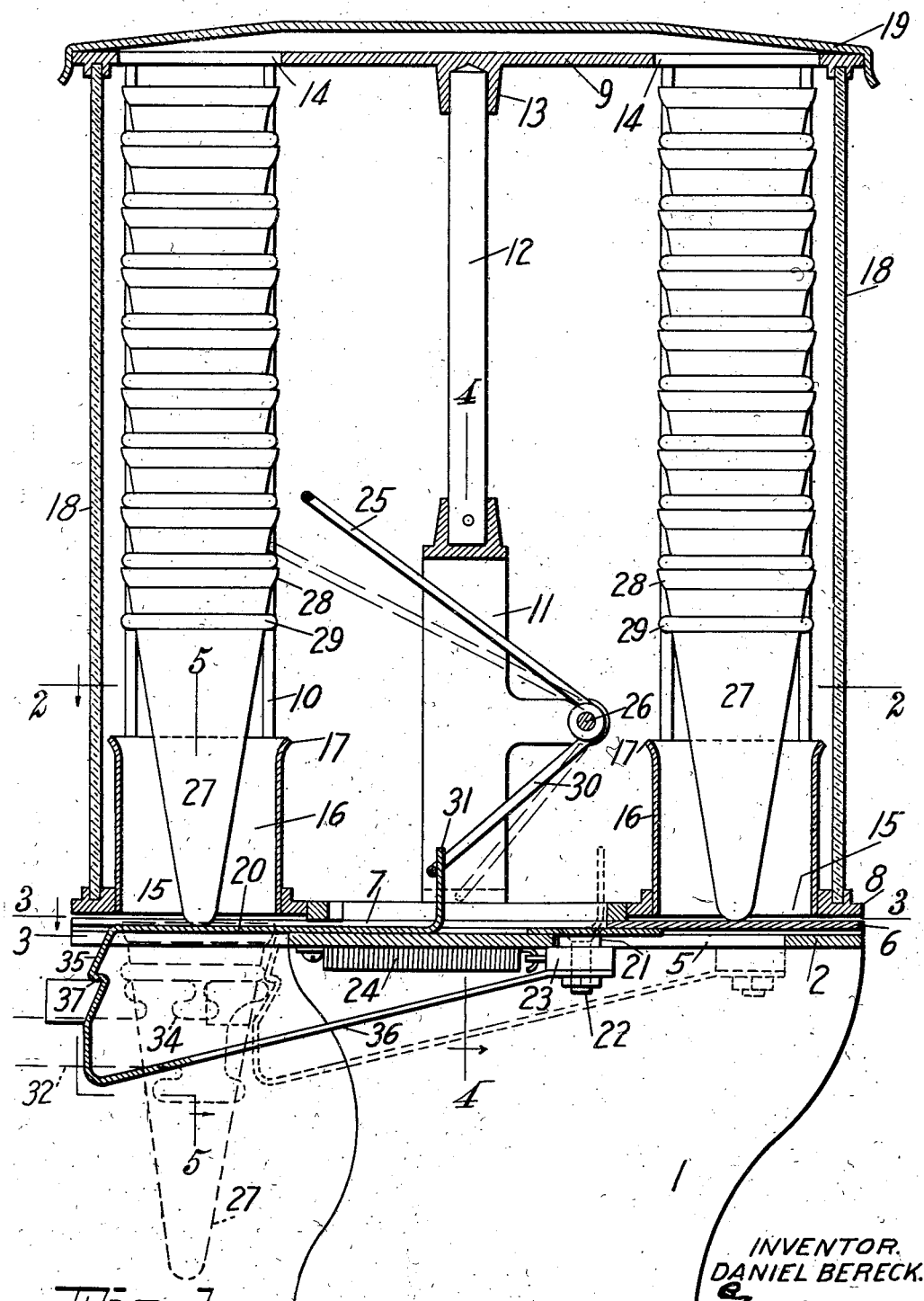
Figure 2:
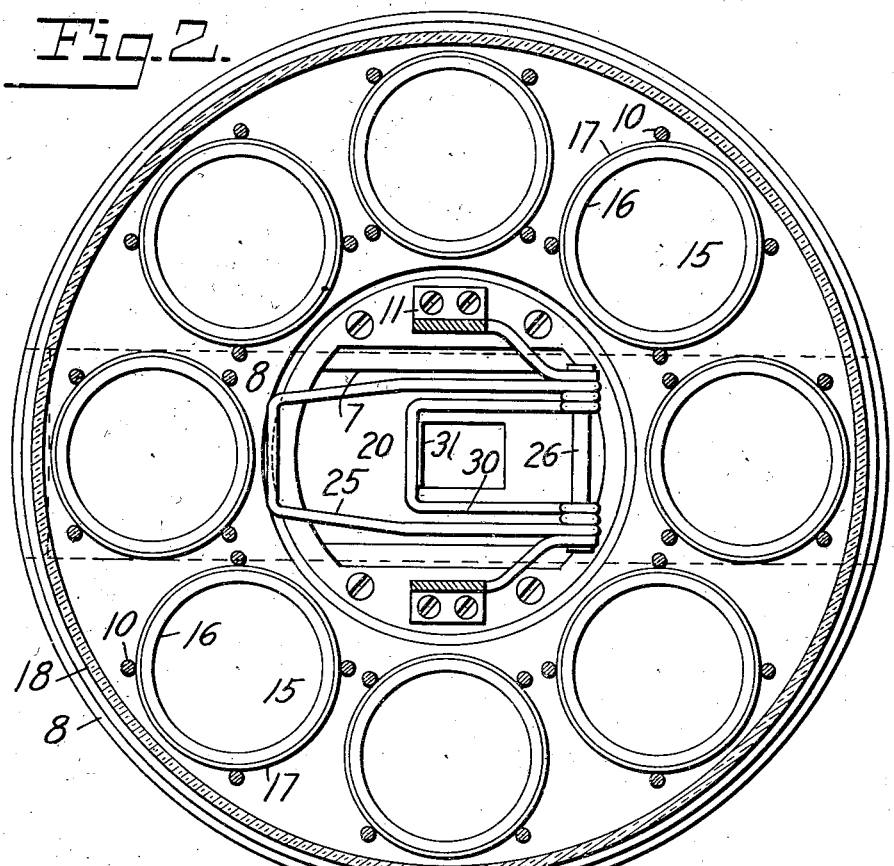
Figure 3:
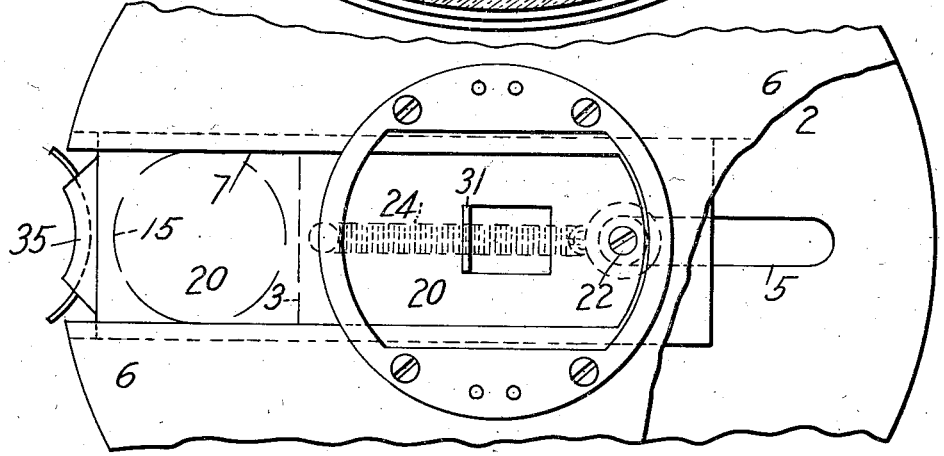

In the accompanying drawings Fig. 1 is a vertical sectional view taken centrally through an apparatus embodying my invention; Fig. 2 is a transverse sectional view taken on the line 2—2 of Fig. 1; Fig. 3 is a transverse sectional view taken on the line 3—3 of Fig. 1; Fig. 4 is a plan view of the supporting base, partly broken away; Fig. 5 is a sectional view taken on the line 4—4 of Fig. 1 and partly broken away; Fig. 6 is a sectional view taken on the line 5—5 of Fig. 1; Fig. 6 is a sectional view of a portion of the apparatus showing the same provided with an ejector; and Fig. 7 is a detail view of the cone handling device.

In these drawings I have illustrated one embodiment of my invention and have shown the same as designed for handling ice cream cones but it will be understood that this particular embodiment has been chosen for the purposes of illustration only and that the apparatus may take various forms and may be used for various purposes.

In carrying out my invention I provide a receptacle or guideway to contain a stack of cones. Associated with this guideway are means for normally retaining the cones within the receptacle, this retaining means being operable to permit the cones to be discharged one at a time from the receptacle. A handling device adapted to receive and support a cone cooperates with the retaining means in the operation of the latter, the arrangement of the parts being such that when the retaining means has been actuated by the handling device to release a cone the handling device will be in a position to receive a cone as it is discharged from the receptacle. The apparatus may comprise a single receptacle or guideway or it may comprise a plurality of such receptacles or guideways.

In that particular embodiment of the invention here illustrated the apparatus comprises a plurality of receptacles or guideways arranged in annular series and the several receptacles are movable successively into operative or discharging position. The character of the receptacles and the means for controlling the discharge of the cones therefrom may take various forms and may be mounted in various ways. As here shown, the apparatus is carried by a supporting structure or bracket 1 adapted to be mounted on or secured to the counter, wall or other structure. This supporting structure has at its upper end a supporting surface or base and, in the present instance, this base comprises a lower portion or plate 2 rigidly secured to the supporting structure 1. This plate 2 is preferably circular in form and the forward portion thereof projects beyond the supporting structure or bracket 1 and has formed therein an opening 3. The plate 2 is provided, at the rear of the opening 3, with a longitudinal slot, as shown at 5. Rigidly secured to the plate 2 is a second circular plate 6 having a wide slot 7 which is arranged directly above and extends rearwardly from the opening 3 in the plate 2. This plate 6 provides the supporting surface of the base. Mounted on the base and arranged above the same is a frame which carries the receptacles or guideways for the several stacks of cones and which is, in the present instance, rotatable to enable the several stacks of cones to be brought successively into line with the opening 3 in the base. As here shown, this frame comprises a lower annular member 8 and an upper circular member 9, the two members being connected one to the other by a plurality of series of rods 10, the rods of each series being arranged to form a receptacle or guideway adapted to receive a stack of cones nested one within the other. This frame may be rotatably supported on the base in any suitable manner but in order to avoid interference with the mechanism which controls the discharge of the cones I have mounted on the base an inverted U-shaped structure or bridge 11, and projecting from the top of this bridge is a post 12, the upper end of which extends into a socket 13 on the top plate 9 and thus rotatably supports the frame as a whole. The top plate 9 has openings 14 in line with the respective receptacles as formed by the several series of rods 10, and through which the cones may be deposited in the receptacles by placing the tubular container, in which the cones are packed, upright above the receptacle and permitting the cones to drop by gravity therefrom into the receptacle. The lower frame member 8 also has a series of openings 15 in line with the respective receptacles and through which the cones may be discharged. In the present device, a tubular guide or chute 16 is inserted in the lower part of each receptacle and has its upper end flared, as shown at 17, to facilitate the discharge of the cones and to prevent the retarding of the same by the annular bead thereon coming in contact with the edge of the discharge opening. The several receptacles are preferably enclosed in a housing, which as here shown comprises a cylindrical glass casing 18 confined between and supported by top and bottom plates 9 and 8 of the supporting frame. A lid or closure 19 is movably supported on the top plate 9 and the cones in the receptacles are thus entirely enclosed and are protected both from dust and from moisture.

The cones in all the receptacles but one are supported by the base plate 6, the small end of the lowermost cone of each stack in such receptacles resting upon the base plate and sliding over the same when the frame is rotated. One of the receptacles is arranged directly above the discharge opening 3 in the base so that the discharge opening for that receptacle is in line with the opening in the base to permit a cone to be discharged from the receptacle through the base. The opening 3 is normally closed by a movable closure 20 which, in the present instance, is in the form of a plate slidably mounted in the groove 7 in the upper plate 6 of the base. A lug 21 depending from the closure plate moves in the guide slot 5 and a screw 22 extends through the lug 21 and has mounted thereon a lug or collar 23 to which is secured one end of a spring 24, the other end of which is connected with the base, the arrangement of the spring being such that it will normally hold the closure plate 20 in a position in line with the discharge opening of the receptacle which is immediately above the same and the small end of the lowermost cone in that receptacle will rest upon the closure plate and the stack of cones will be thereby retained in the receptacle. By retracting the closure plate against the action of its spring the lowermost cone of the stack is released and permitted to drop from the receptacle through the opening in the base. To prevent more than one cone being discharged from the receptable at one time means are provided for engaging the second cone from the bottom and supporting the same while the lowermost cone is being discharged. This supporting means is here shown as a detent 25 pivotally mounted on a shaft or rod 26 carried by the side members of the bridge 11. This detent may conveniently take the form of a wire loop of such length that the outer transverse portion of the loop will engage the second cone by gravity, when the detent is released, and will contact therewith just below the annular bead at the upper edge of the cone and will thus prevent downward movement of the cone. In this connection it may be noted that by far the greater part of the ice cream cones on the market at the present time are identical in form. These cones, as shown at 27, have at their upper edge a circumferential bead 28 and have a second circumferential bead 29 at a point spaced a short distance below the bead 28. The preferable arrangement of the detent 26 is such that it will engage the cone between the two beads. Rigidly connected with the detent is an actuating arm 30 which may also consist of a wire loop, the transverse portion of which lies in front of an upwardly extending finger 31 on the closure plate 20, the arrangement of the parts being such that when the closure plate is moved to its closed position the finger 13 will actuate the arm 30 and cause the detent to be moved to an inoperative position, as shown in full lines in Fig. 1. When the closure 20 is retracted the finger is moved away from the arm of the detent and the latter is permitted to drop by gravity into operative engagement with the second cone from the bottom of the stack, as shown in dotted lines in Fig. 1. There being no positive connection between the finger and the arm the further movement of the finger with the closure will have no effect upon the detent but when the closure is released and again moved to its closed position by the spring 24 the finger will engage the arm 30, retracting the detent and releasing the stack of cones to permit the same to move downward until the lowermost cone is in contact with the closure plate.

The movable closure 22 for the discharge opening may be actuated in any suitable manner but I prefer to provide a cone handling device adapted to actuate the closure to release the lowermost cone and to receive the cone which is so released. This cone handling device may take various forms but that here shown comprises a pair of elongated arms 32 pivotally connected one to the other near one end thereof and acted upon by a spring 33 to hold the arms normally in their separated positions. These two arms constitute a handle and they are provided at their outer or free ends with cone gripping devices or jaws 34. These jaws are preferably shaped to conform substantially to the contour of the cone and thus when in their closed or receiving positions the two jaws constitute a frustum of a cone. These gripping devices or jaws are of relatively large area and inasmuch as they fit snugly about the cone and practically all parts of the inner surfaces thereof have contact with the cone they not only form a very firm support for the cone but the pressure on the cone is so distributed that there is little likelihood of crushing or breaking the cone. This cone handling device and the slidable closure 20 have cooperating parts whereby the handling device may be applied to the closure to actuate the same and release the lowermost cone. As here shown, the closure plate 20 has at is forward end a downwardly extending portion 35, which is here shown as having a brace 36, this brace in the present instance comprising a bar formed integral with the depending portion of the plate and having its rear end secured to the screw 22 which is carried by the closure plate. This depending portion of the closure plate is so arranged that it may be engaged by the outer ends of the cone handling device and moved rearwardly by pressure applied thereto through the handling device. When the closure has been fully retracted by the handling device the cone receiving portion of the handling device will be in a position to receive the cone and the latter will drop directly from the receptacle into the handling device. In order to make certain that the handling device will be spaced such a distance from the discharge opening of the receptacle that the cone entering the handling device may completely clear the receptacle and the base I have provided the downwardly extending portion 35 of the closure with a forwardly extending projection or lug 37 beneath which the handling device is placed when it is engaged with the closure, thus enabling the position of the handling device with relation to the receptacle to be quickly and easily determined.

It will be apparent, therefore, that when the operator desires to serve a cone he will grasp the cone handling device in one hand, move the jaws into their cone receiving positions and then place the same in contact with the depending portion of the closure and press the later rearwardly far enough to completely open the discharge opening leading from the receptacle. The first portion of the rearward movement of the closure will release the detent 25 and the latter will engage the second cone from the bottom to hold the remainder of the stack against downward movement and when the closure has been moved far enough to release the lower cone this cone alone will drop through the discharge opening into the cone handling device. The cone remains in and is supported by the handling device while it is being filled with ice cream and delivered to the customer and consequently the cone is not touched by the hand of the operator at any time. It will be obvious that should the spring 24 break or be omitted the closure can be manipulated by one hand of the operator while the cone handling device is held by the other hand in a position to receive the cone.

The lower bead 29 on an upper cone of the stack will engage the upper edge of the next lower cone and prevent such wedging action between the cones as would cause them to stick together. There are, however, on the market, some cones which do not have these beads and in which the weight of the upper cones of the stack may cause the cones to wedge one within the other to such an extent that when the lower cone is released it will not drop by gravity from the stack. In order that the dispensing apparatus may be used with cones of this type, and that a cone may be discharged upon each operation of the apparatus, a separating device may, if desired, be provided and I have shown such a device in Fig. 6. The mechanism there shown, with the exception of the separating device, is similar to that above described and when the detent 25 engages the inclined wall of the cone at a point below the upper edge thereof it will engage this cone with sufficient pressure to hold the stack of cones against downward movement, even though there is no bead or projection on the cone above the detent. The separating device comprises an arm or rod 38 which is pivotally mounted on the shaft 26 and the forward or free end of which is adapted to engage the upper edge of the lowermost cone of the stack and exert downward pressure thereon. In the present instance, an actuating arm 39 is rigidly secured to the rod 38 of the separating device and has at its lower end a transverse portion 40 which extends through a vertical slot 41 in an upright plate 42 secured to the closure plate 20. The arrangement of the parts is such that when the closure is in its closed position the separating device will be in its inoperative position and when the closure is retracted the separating device will be moved about its axis and the free end thereof caused to engage the upper edge of the cone and press the same downwardly, thus separating the lower cone from the next higher cone and causing it to be discharged. Inasmuch as the apparatus is seldom used exclusively with smooth cones the separating device is of such a character that it may be rendered inoperative when the apparatus is used with the beaded cones. To this end the forward or cone engaging part 43 of the separating device is separate from the rod 38 and is adjustably mounted thereon, the connection as here shown comprising a sleeve 44 rigidly secured to the end portion 43 of the separator and slidably mounted on the rod 38 of the separator, this sleeve being held in adjusted positions by a screw 45. Thus when the apparatus is being used with beaded cones the cone engaging part 43 of the separator is moved to an inoperative position but when smooth cones are being dispensed it is moved outwardly and secured in a position to operatively engage the cones.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a dispensing apparatus for ice cream cones and the like comprising a normally stationary receptacle to contain a stack of cones and having a discharge opening, means to retain said cones in said receptacle, said retaining means being movable with relation to said receptacle and a cone handling device adapted to receive and support a cone, said handling device and said retaining means having cooperating parts to enable said retaining means to be actuated by said handling device to release the lowermost cone of the stack, said parts being so arranged that when said lowermost cone has been released said handling device will be in a position to receive the same.

2. In a dispensing apparatus for ice cream cones and the like comprising a receptacle to contain a stack of cones and having a discharge opening at the lower end thereof, a movable closure for said discharge opening to retain said cones in said receptacle, and a cone handling device to receive a cone from said discharge opening, said cone handling device and said closure having cooperating parts to enable said closure to be actuated by said cone handling device, said parts being so arranged that when said closure has been moved to its open position said handling device will be in a position to receive the cone from said discharge opening.

3. In a dispensing apparatus for ice cream cones and the like comprising a receptacle to contain a stack of cones and having a discharge opening at the bottom thereof, a movable closure for said discharge opening to retain said cones in said receptacle, said closure having a downwardly extending portion at the forward end thereof, and a cone handling device having a cone receiving portion adapted to engage the downwardly extending portion of said closure and move the latter to an inoperative position, the parts being so arranged that when said closure is in an inoperative position the cone receiving part of said cone handling device will lie directly beneath said discharge opening.

4. In a dispensing apparatus for ice cream cones and the like comprising a receptacle to contain a stack of cones and having a discharge opening at the bottom thereof, a movable closure for said discharge opening to retain said cones in said receptacle, said closure having a downwardly extending portion at the forward end thereof, and a cone handling device comprising pivoted members forming a handle and having at their free ends cone engaging devices, said cone engaging devices being adapted to engage the depending portion of said closure and move the latter out of line with said discharge opening.

5. In a dispensing apparatus for ice cream cones and the like comprising a receptacle to contain a stack of cones and having a discharge opening at the bottom thereof, a movable closure for said discharge opening to retain said cones in said receptacle, said closure having a downwardly extending portion at the forward end thereof, and said portion having a part forming a stop, a cone handling device having a cone receiving part adapted to engage said downwardly extending portion of said closure beneath said stop and to move said closure out of line with said discharge opening.

6. In a dispensing apparatus for ice cream cones and the like comprising a receptacle to contain a stack of cones and having a discharge opening, operable means to retain said cones in said receptacle, a cone handling device adapted to receive and support a cone, said handling device and said retaining means having cooperating parts to enable said retaining means to be actuated by said handling device to release the lowermost cone in the stack, said parts being so arranged that when said lowermost cone has been released said handling device will be in a position to receive the same, and means controlled by said retaining means to support the upper cones of said stack while said lowermost cone is being discharged.

7. In a dispensing apparatus for ice cream cones and the like comprising a receptacle to contain a stack of cones and having a discharge opening, operable means to retain said cones in said receptacle, a cone handling device adapted to receive and support a cone, said handling device and said retaining means having coperating parts to enable said retaining means to be actuated by said handling device to release the lowermost cone in the stack, said parts being so arranged that when said lowermost cone has been released said handling device will be in a position to receive the same, a detent to engage the cone next above said lowermost cone and hold the same against downward movement, and means actuated by said retaining means to control the position of said detent.

8. In a dispensing apparatus for ice cream cones and the like comprising a receptacle to contain a stack of cones and having a discharge opening, a movable closure for said discharge opening to retain said cones in said receptacle, a cone handling device to receive a cone from said discharge opening, said handling device and said closure having cooperating parts whereby said closure may be moved to an inoperative position by said handling device, a gravity pawl arranged to engage that cone of said stack next above the lowermost cone and support the same while the lowermost cone is being discharged, and means actuated by said closure for controlling the position of said pawl.

9. In a dispensing apparatus for ice cream cones and the like comprising a receptacle to contain a stack of cones and having a discharge opening, a closure for said discharge opening to retain said cones in said receptacle, said closure being movable to an inoperative position to release the lowermost cone of said stack, a gravity detent arranged to engage the cone next to said lowermost cone and support the same while the lowermost cone is being discharged, means controlled by the movement of said closure to control the position of said detent, a movable member arranged to engage the upper edge of said lowermost cone, and means controlled by the movement of said closure to cause said member to exert downward pressure on said lowermost cone.

10. In a dispensing apparatus for ice cream cones and the like comprising a receptacle to contain a stack of cones and having a discharge opening, a closure for said discharge opening to retain said cones in said receptacle, said closure being movable to an inoperative position to release the lowermost cone of said stack, a gravity detent arranged to engage the cone next to said lowermost cone and support the same while the lower- most cone is being discharged, means controlled by the movement of said closure to control the position of said detent, a movable member arranged to engage the upper edge of said lowermost cone, and means controlled by the movement of said closure to cause said member to exert downward pressure on said lowermost cone, the cone engaging portion of said member being movable into and out of an operative position with relation to said cone.

11. In a dispensing apparatus for ice cream cones and the like comprising a receptacle to contain a stack of cones and having a discharge opening, a member arranged beneath said discharge opening to support said stack of cones within said receptacle, said member being movable to a position to release the lowermost cone, a detent pivotally mounted adjacent to said receptacle and movable by gravity into engagement with that cone next above the lowermost cone, an arm connected with said detent, a part carried by said movable member and acting on said arm to control the position of said detent, a separating device pivotally mounted adjacent to said receptacle, an arm connected with said separating device, and a part carried by said movable member to engage the last mentioned arm and cause said separating device to exert downward pressure on the lowermost cone.

12. In a dispensing apparatus, for ice cream cones and the like comprising a base having an opening therethrough and a movable closure for said opening, and a frame rotatably mounted above said base and comprising a plurality of receptacles each adapted to contain a stack of ice cream cones and each having a discharge opening at its lower end, said frame being rotatable to bring said receptacles successively into a position above said closure, whereby the cones in that receptacle above said closure will be supported by the closure and the cones in the other receptacles will be supported by said base, a cone handling device adapted to receive and support a cone, said handling device and said closure having cooperating parts whereby said closure may be moved to an inoperative position by said handling device, said parts being so arranged that when said closure has been moved to its inoperative position said handling device will be in a position to receive a cone discharged from the opening in said base.

13. In a dispensing apparatus for ice cream cones and the like comprising a receptacle to contain a stack of nested cones each having a bead near the upper end thereof, said receptacle having a discharge opening, and a closure for said discharge opening to retain said cones in said receptacle, said closure being movable to a position out of line with said discharge opening to permit the lowermost cone of said stack to move in a vertical line away from the next higher cone and through said discharge opening, and a gravity detent arranged to engage the bead of said next higher cone and support the same while the lowermost cone is being discharged, and means controlled by said closure to control the position of said detent.

14. In a dispensing apparatus for ice cream cones and the like comprising a receptacle to contain a stack of cones each having a laterally extending part, said receptacle having a discharge opening, a closure for said opening, a member arranged beneath said discharge opening to support said stack of cones in nested relation in said receptacle, said member being movable to a position to permit the lowermost cone to move in a vertical line through said discharge opening, a supporting device movable into a position to engage beneath the laterally extending part of the cone next above the lowermost cone and support said cone, and means movable with said closure to control the position of said device.

15. In a dispensing apparatus for ice cream cones and the like comprising a receptacle to contain a stack of cones each having a laterally extending part, said receptacle having a discharge opening, a member arranged beneath said discharge opening to support said stack of cones in nested relation within said receptacle, said member being movable to a position to permit the lowermost cone to move in a vertical line through said discharge opening, a detent pivotally mounted adjacent to said receptacle and movable by gravity into engagement with the laterally extending part of that cone next above the lowermost cone, an arm connected with said detent, and a part carried by said movable member and acting on said arm to control the position of said detent.

16. In a dispensing apparatus for ice cream cones and the like comprising a base having an opening therethrough, a movable closure for said opening, and a plurality of receptacles each adapted to contain a stack of cones and each having a discharge opening, the discharge opening of one of said receptacles being arranged above said closure and the discharge openings of the other receptacles being arranged above said base, said receptacles being movable successively into line with said movable closure, means for moving said closure to a position to release the lowermost cone in that receptacle which is above the same, a detent mounted on said base and arranged to engage the cone next above the lowermost cone in that receptacle which is above said closure, and means connected with said closure to control the position of said detent.

17. A dispensing apparatus comprising a receptacle to contain a stack of nested articles, said receptacle having a discharge opening, a closure for said discharge opening, said closure normally urged into the forward position by action of a spring, a detent adapted to support next to the bottom cone when said closure is moved to permit an article to be discharged, means controlled by said closure to control the position of said detent.

In testimony whereof, I affix my signature hereto.

DANIEL BERECK.